United States Patent [19]

Sand et al.

[11] Patent Number: 5,028,929
[45] Date of Patent: Jul. 2, 1991

[54] ICING HAZARD DETECTION FOR AIRCRAFT

[75] Inventors: Wayne R. Sand, Louisville; Robert A. Kropfli, Boulder, both of Colo.

[73] Assignee: University Corporation for Atmospheric Research, Boulder, Colo.

[21] Appl. No.: 515,487

[22] Filed: Apr. 30, 1990

[51] Int. Cl.$^5$ .......................... G01S 13/38; G01S 13/95
[52] U.S. Cl. .......................... 342/26; 342/22; 342/460
[58] Field of Search .......................... 342/26, 460, 22

[56] References Cited

U.S. PATENT DOCUMENTS

| | | | |
|---|---|---|---|
| 3,665,466 | 5/1972 | Hibbard | 342/59 |
| 4,015,257 | 3/1977 | Fetter | 342/26 |
| 4,050,067 | 9/1977 | Elmore, Jr. | 342/191 |
| 4,075,555 | 2/1978 | Wight et al. | 342/22 X |
| 4,613,938 | 9/1986 | Hansen et al. | 364/420 |

OTHER PUBLICATIONS

D. Atlas, "The Estimation of Cloud Parameters by Radar", II, *Journal of Meteorology*, pp. 309–317 (Aug. 1954).

J. Goldhirsh and I. Katz, "Estimation of Raindrop Size Distribution Using Multiple Wavelength Radar Systems", ti Radio Science, vol. 9, No. 4, pp. 439–446 (Apr. 1974).

W. Sand et al, "Icing Conditions Encountered by a Research Aircraft", 23, *Journal of Climate and Applied Meteorology*, pp. 1427–1440 (Oct. 1984).

M. Politovich, "Measurements of Hazardous Icing Conditions", 3rd Int'l. Conference on the Aviation Weather System, Anaheim, Calif., 29 Jan.–3 Feb., 1989.

*Primary Examiner*—Thomas H. Tarcza
*Assistant Examiner*—John B. Sotomayor
*Attorney, Agent, or Firm*—Dorr, Carson, Sloan & Peterson

[57] ABSTRACT

An airborne Icing Hazard Detector for aircraft uses dual frequency radar beams which are transmitted into a cloud ahead of the aircraft. The reflected signals at each of the two frequencies are compared and processed to determine the presence, amount and location of regions of liquid water in the cloud. The presence of liquid water is determined as a result of liquid water attenuating the power of one of the signals a greater amount than the other signal, due to different attenuation characteristics of the two signals at the two frequencies. A temperature sensor provides ambient temperature information to determine if the detected liquid water is super-cooled. Upon detection of a predetermined amount of liquid water and the determination that it is super-cooled, an advance warning indication is provided to allow the pilot to avoid flying through the volumetric region of supercooled liquid water and risking ice formation on the aircraft.

18 Claims, 3 Drawing Sheets

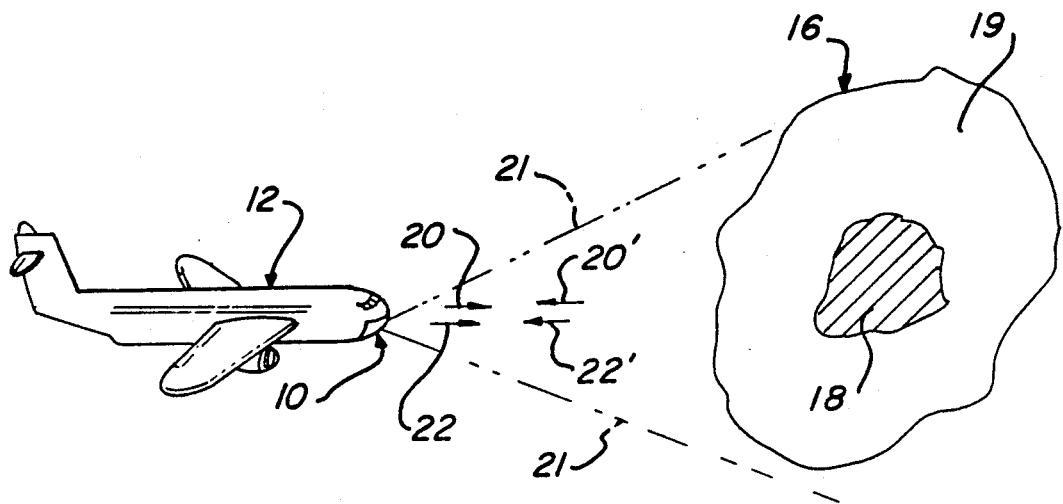
Fig_1
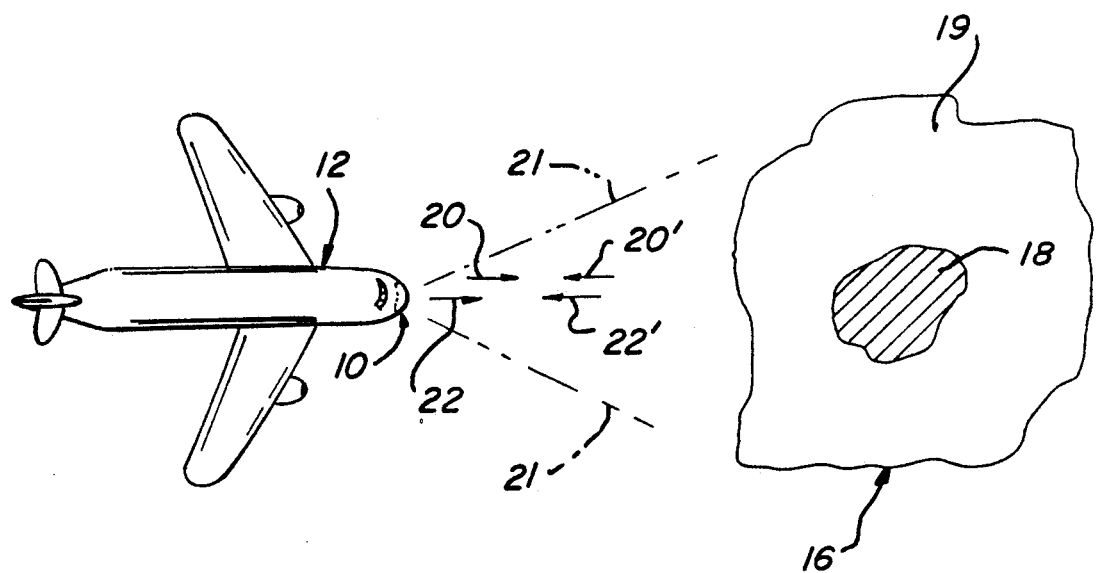
Fig_2

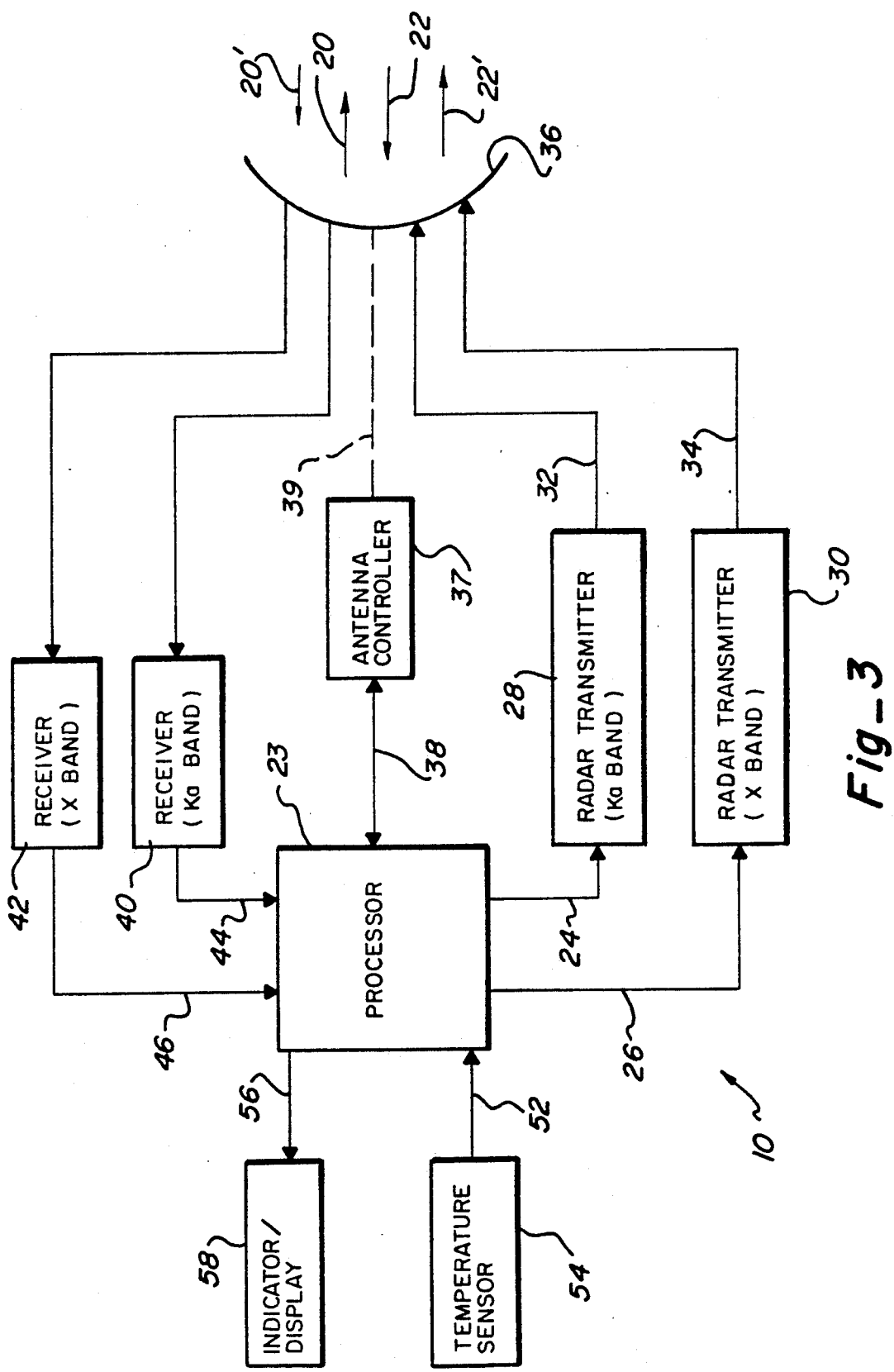
Fig_3

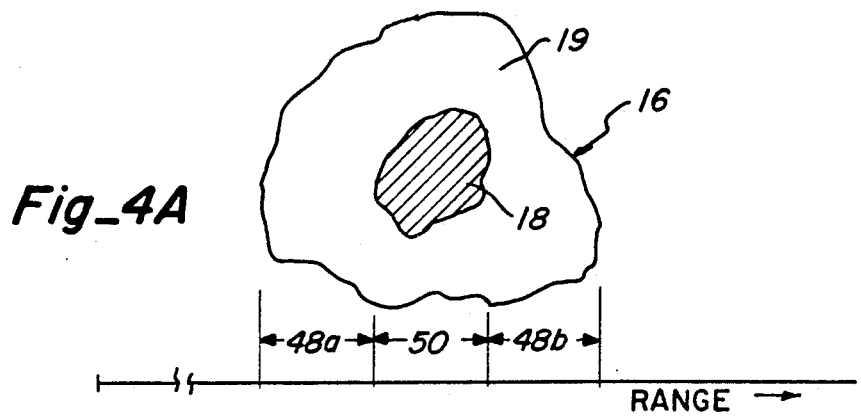
Fig_4A
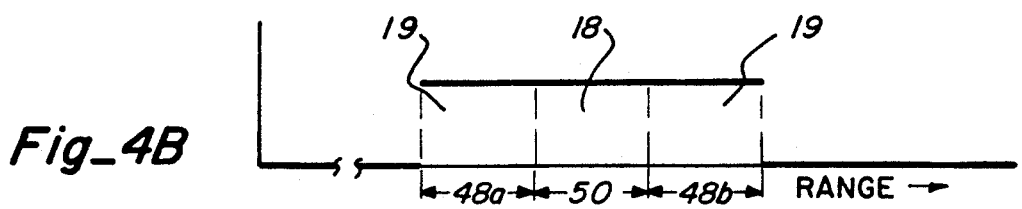
Fig_4B
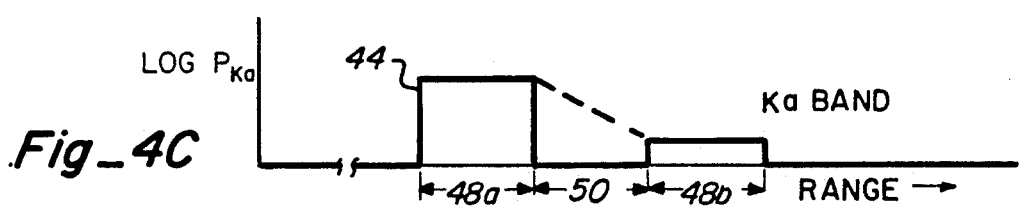
Fig_4C
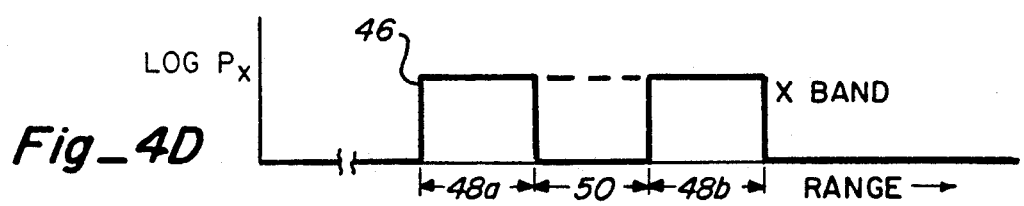
Fig_4D
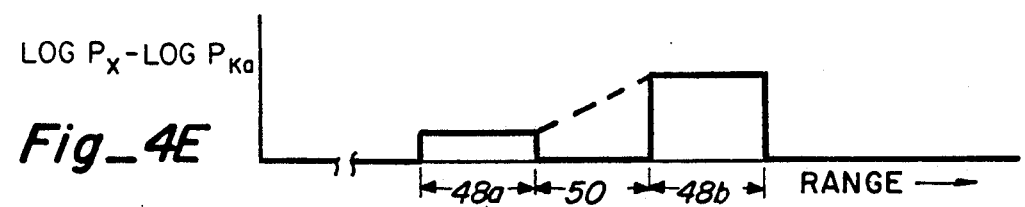
Fig_4E
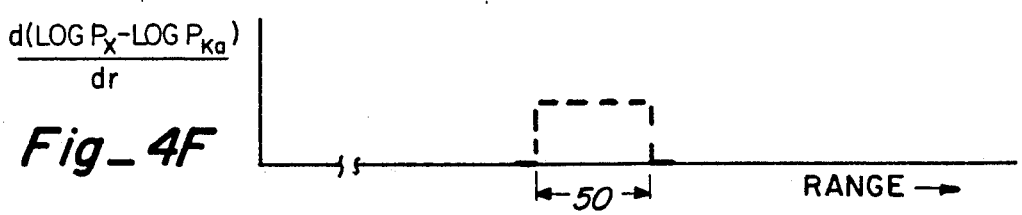
Fig_4F

ICING HAZARD DETECTION FOR AIRCRAFT

LICENSE TO U.S. GOVERNMENT

The United States of America is hereby granted a non-exclusive, royalty-free license to manufacture and use the invention claimed herein, for governmental purposes.

INTRODUCTION

This invention relates to the detection of atmospheric conditions which would be likely to cause icing on the exposed surfaces of an aircraft such as the wings and tail surfaces. More particularly, the present invention relates to a method and apparatus for detecting super-cooled liquid water which is likely to create these icing conditions, through the use of a forward-looking dual-frequency radar system within the aircraft, thereby providing the aircraft pilot with an opportunity to avoid these potentially hazardous conditions.

BACKGROUND OF THE INVENTION

Super-cooled liquid water (SLW) droplets form in clouds when water vapor accumulates to saturation levels and condenses on cloud condensation nuclei at temperatures from 0° centigrade to minus forty degrees centigrade. SLW droplets grow by further condensation and by collisions with other drops and coalesce to sizes in excess of 100 micrometers, at which point the droplets begin to fall as precipitation. Over time, therefore, the spectrum of droplet size increases until there are many droplets of different sizes. SLW droplets eventually change to a vapor phase (evaporate) or to a solid (ice) phase (freeze), or they grow to a size sufficient to precipitate. The SLW droplets are a temporary phase, lasting anywhere from less than one minute to several hours.

SLW droplets are formed in specific volumetric zones or regions within clouds. The region of SLW droplets may contain substantially only SLW droplets, or as is the more typical case, it may also contain ice crystals distributed throughout and mixed with the SLW droplets. In such circumstances, the region of SLW droplets and ice crystals is referred to as a mixed phase region.

Ice crystals are less readily and less abundantly nucleated in the atmosphere than are liquid droplets. Therefore, at all but the coldest temperatures, SLW droplets will form before ice crystals. Ice crystals nucleate by several mechanisms, and the rate at which crystals nucleate is a complex function of the ice nuclei concentration, the temperature, the water droplet size distribution, and humidity.

In mixed phase regions the presence of ice crystals tend to deplete the concentration of SLW droplets. Sometimes, an approximate balance is achieved between the rate of creation of SLW droplets by condensation within updrafts and the rate of depletion of SLW droplets by the growing ice crystals. In such circumstances the amount of SLW in the mixed phase region remains nearly constant. In other situations, the condensation rate will not keep up with the depletion rate of SLW droplets caused by the proximity of ice crystals, and the region tends to change from a mixed phase region to one containing only ice crystals. Further still, if the depletion of SLW droplets by the presence of ice particles is not too great, the amount of SLW in the region can increase by further condensation from a cloud updraft, for instance, causing the mixed phase region to change to a region which is predominantly or only SLW droplets.

Sufficient quantities of SLW droplets in the flight path of an aircraft have the potential to adversely impact its flight performance. SLW droplets turn to ice on contact with all components of the aircraft exposed to the airstream and which are not in some way protected. A coating of ice on the leading edges of the wings reduces the amount of lift, increases the amount of drag, and, if the coating is substantial enough, may even cause the aircraft to crash. Statistics suggest the seriousness of aircraft icing incidents. An average of over 60 civilian lives appear to be lost every year due to icing related aircraft accidents. During a five and a half year period between 1978 and 1983, 280 icing-related aircraft accidents occurred with 364 fatalities and 161 injuries.

Current weather warning radars detect precipitation sized particles in clouds, primarily as the result of analyzing return or echo signals which have been reflected by particles of sufficient size to cause a measurable reflection. Generally these weather radars are not sensitive enough to detect liquid droplets that are often only a few tens of micrometers in diameter. Because the reflected signals occur as a result of the particle size, such weather warning systems are not capable of distinguishing between water droplets and ice particles. Even if current weather radar systems had sufficient sensitivity to distinguish between liquid droplets and ice crystals, the signals reflected from the liquid droplets would be masked by the presence of ice crystals in mixed phase clouds. Furthermore, if these weather warning systems are ground based, it is difficult or impossible to determine the temperature of the liquid water droplets. Current airborne weather warning radar systems are subject to the same shortcomings as ground based weather warning systems. In short, current weather warning radar systems cannot distinguish between clouds with hazardous amounts of SLW, or determine whether regions of liquid water are supercooled.

Weather and atmospheric reports are available for pilots to use in navigation, but frequently these weather reports are dated or inaccurate. The rapidity with which the state and size of regions of SLW droplets may change as described above, the inability of weather warning systems to detect regions of SLW droplets, the localized nature of the regions of SLW droplets, and the practical limitation of being unable to communicate changes in atmospheric conditions to pilots as quickly as the those conditions may change, lead to the practical realization that current weather information available to aircraft pilots is of little value in avoiding hazardous icing conditions. At the present time, no warning system is available to pilots to indicate those regions of SLW within clouds in time to divert the course of the aircraft, and to detect conditions which could create a risk of aircraft icing due to the existence of regions of SLW while distinguishing other conditions which pose no threat to aircraft.

It is with respect to this briefly summarized background information and other information that the present invention has evolved.

SUMMARY OF THE INVENTION

An airborne icing hazard detection system of the present invention offers the capability of providing information which distinguishes a region containing SLW droplets in clouds from a region containing ice crystals, even in a mixed phase cloud region. Information as to the size and location of the region containing SLW is presented to the aircraft pilot, to be used in making decisions regarding possible maneuvers to avoid the regions of SLW.

In accordance with the major aspects of the icing hazard detection system of the present invention, an airborne, forward-looking, dual-frequency radar system is carried by the aircraft and is used to detect and indicate the size and location of regions of SLW droplets ahead of the aircraft in its flight path. The radar signal or beam at one frequency, i.e. the higher frequency, is more attenuated by propagation through a region containing liquid water droplets, while the radar signal or beam at the other frequency, i.e. the lower frequency, is less attenuated by passage through the region containing liquid water droplets. The influence of ice crystals on the two radar signals is relatively negligible, thereby allowing regions of liquid water droplets to be distinguished from ice crystals.

The relative difference in attenuation is determined from sensing the respective strengths of the two signals propagating through and reflecting back from the region of liquid water droplets. The relative difference in attenuation of the two reflected signals is used to determine the existence of liquid water in the flight path of the aircraft. The atmospheric temperature ambient to the aircraft is also determined with an on-board temperature sensor. Because the ambient atmospheric temperature is nearly equal to the temperature in the cloud ahead of the aircraft at the same altitude within the effective range of the radar beams, the ambient temperature measurement is used to determine whether the region of detected liquid water ahead of the aircraft is SLW.

The range derivative of the resulting difference in attenuation is calculated. The range derivative is proportional to the amount of SLW in the region ahead of the aircraft. From the range derivative, a determination is made whether the amount of liquid water is greater than a predetermined threshold which defines that amount which is enough to be of concern from an icing standpoint. When the amount of detected liquid water is above a predetermined threshold and the expected atmospheric temperature is below 0° centigrade, an indication is delivered of conditions which may give rise to a likelihood of hazardous icing conditions in the flight path of the aircraft.

The size and location of the region of the hazardous icing conditions is also indicated, using conventional radar imaging and display techniques. By detecting the hazardous regions of SLW well in advance and providing information as to the size and location of the region of SLW, the pilot has an opportunity to avoid flying through the region of potentially hazardous icing conditions.

A more complete understanding of the nature of the present invention and its advantages and improvements can be obtained from the following detailed description of a presently preferred embodiment of the invention taken in conjunction with the accompanying drawings, briefly described below, and from the appended claims.

DETAILED DESCRIPTION OF THE DRAWINGS

FIG. 1 is a side illustration of an aircraft, an Icing Hazard Detector (IHD) according to the present invention located on and carried by the aircraft, and an idealized mixed phase cloud (shown in cross-section) in the flight path of the aircraft. The cloud contains an outer region of ice crystals and an inner region containing SLW or a mixture of SLW and ice crystals, all of which generally illustrates the use of the present invention.

FIG. 2 is an top plan illustration of the scene depicted in FIG. 1.

FIG. 3 is a block diagram of the system components of the IHD shown in FIGS. 1 and 2.

FIG. 4A is an illustration of the idealized cloud shown in FIGS. 1 and 2.

FIG. 4B is an illustration of the distribution of ice crystals and SLW droplets along a radar beam or signal through the cloud shown in FIG. 4A.

FIGS. 4C and 4D are graphical representations of power received by the IHD from reflection of the two transmitted radar beams from the cloud shown in FIG. 4A, as a function of range relative to the aircraft.

FIG. 4E is a graphical representation of the difference in power of the two radar beams received by the IHD as shown in FIGS. 4C and 4D.

FIG. 4F is a graphical representation of the range derivative of the difference in power represented in FIG. 4E.

DETAILED DESCRIPTION

An airborne Icing Hazard Detector (IHD) 10 for determining the existence and amount of super-cooled liquid water (SLW) in the atmosphere ahead of an aircraft 12 flying at an altitude above the earth's surface 14, is shown in FIGS. 1 and 2. Located in the present flight path of the aircraft 12 is mixed phase cloud 16 containing an internal region 18 of SLW or a mixture of SLW and ice crystals, and a surrounding outer region 19 of only ice crystals. Two radar beams 20 and 22 are transmitted at different predetermined frequencies in pulsed form forward from the aircraft 12. The direction of transmission of the beams 20 and 22 is scanned in vertical and horizontal sectors in front of the aircraft, as is shown by the dashed lines 21 in FIGS. 1 and 2.

The transmitted beams 20 and 22 are reflected and scattered by the cloud 16 and become reflected signals 20' and 22', respectively, which are returned to and received by the IHD 10. The received power of the two reflected signals 20' and 22' and a signal representative of the temperature ambient to the aircraft are evaluated by the IHD 10.

By processing the two received signals and the temperature signal, the existence and quantity of SLW in the region 18 is determined to evaluate whether it poses an icing hazard, the ice crystals contained in the regions 18 and 19 are distinguished from the SLW contained in the region 18, and the size and location of the region 18 of SLW is indicated to the pilot of the aircraft 12. Since the temperature ambient at the aircraft will be substantially equivalent at the same altitude within the cloud 16 in general range of the radar beam, and because changes in temperature above and below the aircraft can usually be predicted based on the ambient temperature and a standard temperature change rate with altitude, the super-cooled nature of the detected liquid water can usually be reliably predicted. The expected operating range of the IHD is from about 100 meters in front of the aircraft to about 50 kilometers in front of the aircraft.

Details concerning the system of the IHD 10 are shown in FIG. 3. The heart of the IHD is a computer or processor 23. The processor 23 sends signals to and receives signals from the other components of the IHD 10, processes data obtained from its input signals to obtain the information and supply the indications and displays of that information noted above and described in detail below.

The processor 23 sends timing and control signals at 24 and 26 to trigger radar transmitters 28 and 30 to generate the radar beams 20 and 22 as pulses 32 and 34, respectively. Although not required, preferably both transmitters 28 and 30 are triggered simultaneously. Each transmitter generates a radar beam at a different predetermined frequency than the other transmitter, and the power of the generated radar beam pulses 32 and 34 is at a predetermined level. The radar beam pulses 32 and 34 are delivered to a forward-pointing antenna 36 from which they are transmitted as the radar beams 20 and 22. The frequency of the beam 20 produced by transmitter 28 is preferably about 35 Gigahertz (GHz), referred to as the Ka band. The frequency of the beam 22 produced by transmitter 30 is preferably about 9.3 GHz, referred to as the X-band.

The frequencies of the two beams 20 and 22 are selected to exhibit measurably different attenuation characteristics as the two signals propagate through liquid water in clouds, and relatively similar attenuation characteristics when propagating through regions of ice crystals. The frequencies of the two signals may vary from those preferred frequencies noted above, so long as these considerations are achieved and the received signals are sufficiently strong to be detectable, as described herein.

The preferred frequencies noted above are desirable because they are commonly used radar frequencies and because they possess the desired attenuation characteristics. Furthermore, many aircraft currently have an X-band weather radar system with an antenna, which will allow the IHD of the present invention to be adapted to the aircraft by adding a Ka band radar that utilizes the same antenna and produces a Ka band beam pattern similar to the X band beam pattern.

The antenna 36 both transmits the beams 20 and 22 produced by the transmitters 28 and 30, respectively, and receives the reflected signals 20' and 22'. The antenna 36 can be swept vertically and horizontally to scan predetermined horizontal and vertical sectors shown by the dashed lines 21 (FIGS. 1 and 2) in front of the aircraft. An antenna controller 37 receives control signals 38 from the processor 23 and responds through a conventional mechanical or electronic linkage, schematically represented at 39, to pivot or sweep the antenna 36 through the horizontal and vertical sectors. Since the processor 23 generates the control signals 38, the processor is able to obtain antenna angular information to enable calculation of the information necessary to create the plan position indicator and range height indicator displays typical of radars, and by which the size and location of the regions 18 of SLW are displayed to the pilot.

The antenna 36 picks up the reflected signals 20' and 22' at the two different frequencies and supplies them to receivers 40 and 42, respectively. Output signals in the form of received signals 44 and 46 are supplied from the receivers 40 and 42, respectively, to the processor 23. The magnitudes of the received signals 44 and 46 relate to the power present in the two reflected signals 20' and 22', respectively. The processor also analyzes the two received signals to establish the information to create the range height and plan position displays in the typical manner.

FIGS. 4C and 4D illustrate the characteristics of the two received signals which have been influenced by scattering from ice particles and the attenuation caused by the propagation through the liquid water region 18 of the cloud 16 shown in FIGS. 4A and 4B.

The effect on the higher frequency signal is shown in FIG. 4C. Propagation of the higher frequency signals 20 and 20' through the beginning portion of the region 19 of ice crystals, shown by the range interval 48a, results in little attenuation of the received signal 44, because the ice crystals have a negligible attenuation effect on the signal. If the region 18 contains only liquid water droplets there will be no signal reflected from that region, because of the absence of ice crystals to reflect the radar beam and the liquid water droplets are likely to be too small to detect. Consequently there will be a negligible received signal from the region 18 over the range interval 50, as shown in FIG. 4C by solid lines. However, the radar signals will be attenuated by propagation through the region 18, even though there is no reflected signal from this region to represent the attenuation. The amount of attenuation is represented by the decrease in power of the received signals reflected from the ice crystal portion of the far side of the cloud, shown by the range interval 48b, compared to the amount of power reflected from the beginning portion of the region 19, shown by the range interval 48a. The relative difference in power of the signals over the range intervals 48a and 48b when no change is apparent in the lower frequency signal shown in FIG. 4D, represents the attenuation by the pure liquid water in the region 18. The processor 23 (FIG. 3) determines the amount of this difference in power to establish the amount of attenuation attributable to the liquid water.

If the region 18 contains a mixture of liquid water and ice crystals, those ice crystals will reflect a signal from the region 18, as is shown in FIG. 4C by the dashed lines over the range interval 50. Thus the slope of the dashed line curve represents the degree to which the liquid water in the region 18 attenuates the signal over the range interval 50. The amount of attenuation through the beginning and ending portions 48a and 48b of the region 19 is negligible because of the negligible attenuation of the signal by the ice crystals.

Propagation of the lower frequency signals 22 and 22' through the beginning and ending portions of the region 19 of ice crystals shown at the range intervals 48a and 48b in FIG. 4D, and through the region 18 of either liquid water or a mixture of liquid water and ice crystals results in little attenuation of the received signal 46. The lack of attenuation by either the ice crystals or the liquid water results simply from the negligible attenuation characteristics on the lower frequency radar beam.

The liquid water within the region 18 over the range interval 50 absorbs more of the power from the higher frequency radar signal and results in a greater attenuation of it compared to the other lower frequency radar signal. The amount of attenuation which occurs depends on the amount of liquid water in the region 18 and the length of the range 50 through which the higher frequency signal propagates. The greater the range interval 50 through which the radar signal travels, the greater will be the total attenuation of the received signal.

Differences in attenuation characteristics of the two radar signals allow the region 18 containing liquid water to be identified over the range interval 50 and also allows the region 19 of ice crystals to be identified over the range intervals 48a and 48b. The distinction between those regions composed solely of ice crystals and mixed phase regions is made possible by the negligible absorption of power at both frequencies when only ice crystals are present and by the significant differences in absorption of one of the two frequencies caused by the presence of liquid water.

Specifically, radar signals at the 35 GHz frequency (Ka-band) are attenuated by liquid water by 1.25 decibels (dB) per kilometer per gram per cubic meter of water through which the signal passes, while radar signals at the 9.3 GHz frequency (X-band) are attenuated by 0.112 dB per kilometer per gram per cubic meter of water. Therefore, attenuation of the Ka-band signal by liquid water is about ten times greater than is the X-band signal. Ice (solid water) causes attenuation of a much smaller amount for each frequency. For ice, the rate is 0.00291 dB per kilometer per gram per cubic meter for the Ka-band signal and 0.000891 dB per kilometer for the X-band signal. The attenuation caused by ice is therefore about two orders of magnitude less than that caused by liquid water. Consequently, the attenuation effect of ice is negligible for the purposes of this invention and clouds containing liquid water can be readily distinguished from clouds containing only ice crystals. It is the liquid water which may give rise to an icing hazard, since ice crystals in clouds do not collect on the wings and tail surfaces of an aircraft.

By sweeping the antenna 36 (FIG. 3) in the conventional manner as described above, the distance or range interval information and the angular information of the antenna obtained over the sweep allows the processor 23 (FIG. 3) to calculate information which defines the size and location of the region 18 in front of the aircraft. The size and location of the region 18 is preferably presented as the typical plan position indicator and range height indicator displays of a conventional radar.

The processor 23 computes the difference in energy of the two received signals 44 and 46 at the different frequencies, as is illustrated by FIG. 4E. For the situation where the region 18 is a mixed phase region containing both liquid water and ice crystals, the range derivative of this difference (FIG. 4E) with respect to distance is then calculated, as is illustrated by FIG. 4F. The range derivative of the difference in attenuation between the two different frequency received signals is directly proportional to the quantity of liquid water ahead of the aircraft. The range derivative (FIG. 4F) enables the processor to distinguish between those situations where the quantity and range extent of SLW is sufficient to be regarded as a significant icing hazard, and those situations where there is an insufficient quantity of SLW or that its spatial distribution is too limited to represent an icing hazard.

In those situations where the region 18 contains solely liquid water, the calculations to establish the difference in received power and the average difference in power over the range interval of the region 18 are also accomplished by the processor, generally on an interpolation basis.

The following equation is one example of a mathematical expression for determining the amount of liquid water by measuring the received power as a function of range:

$$M = (4.38/D) \log[P_k(r)P_x(r+D)/|P_k(r+D)P_x(r)|]$$

where M is the mean liquid water content (in grams per cubic meter) between r and (r+D), $P_k$ is the power of the reflected signal of the strongly attenuated signal, e.g., the Ka band radar received signal 44, $P_x$ is the power of the reflected signal of the weakly attenuated signal, i.e. the X-band radar received signal 46, r is the range of the SLW region in front of the aircraft, and D is the range interval 50 over which the value of M is averaged. This equation is one example of a numerical finite difference expression to approximate the range derivative. Other suitable mathematical expressions are also available to obtain the information necessary to practice the present invention.

To determine if the detected quantity of liquid water is super-cooled, the outside ambient temperature is measured. The measured temperature is generally the same at the same altitude within the cloud ahead of the aircraft at the same altitude. The measured temperature is used to determined whether the detected regions of liquid water in front of the aircraft will be super-cooled or not. A correction based on moist adiabatic lapse rate can be applied when the radar beam is not transmitted horizontally.

As is shown in FIG. 3, the processor 23 receives an input temperature signal 52 from a temperature sensor 54. The temperature signal 52 is used by the processor 23 to determine if the outside ambient temperature at the present altitude of the aircraft is below 0° centigrade. The sensor 54 may be a known device for measuring temperature. Information from the temperature signal 52 and information concerning the moist adiabatic lapse rate is used by the processor 23 to estimate the temperature of clouds ahead of the aircraft at a different altitude when the region 18 is located with a vertically scanning antenna or as a result of a non-horizontal flight path as described above. Of course, if the estimated cloud temperature is insufficient to create SLW conditions, the processor 23 will not signal an indication of a hazardous condition.

The processor 23 determines if the detected amount of liquid water (FIG. 4F) is greater than a predetermined threshold which is regarded as the minimum amount of SLW which will be detrimental to the aircraft. The predetermined threshold may vary according to the type of aircraft and equipment available on the aircraft to counteract icing. Furthermore, the threshold may vary depending on the length of the region of SLW, in that longer projected flight paths through the region of SLW might require a lower threshold. Comparison of the amount of detected liquid water to a threshold value assures that there are no false indications when the quantity of liquid water is insufficient in magnitude to create a significant hazard and when the ambient air temperature at the location of the region of SLW is above 0° centigrade.

When the processor determines that a minimum liquid water threshold level is exceeded and the ambient temperature is sufficiently low, a signal 56 is sent to an indicator and display 58, as is shown in FIG. 3. The signal 56 contains information which is interpreted by the indicator/display 58 to indicate an icing hazard. The signal 56 also contains information which the indicator/display 58 interprets to display or otherwise indicate the size and location of the region of SLW which creates the hazard and the regions of ice crystals, preferably in the typical radar plan position indicator and range height indicator formats. The indicator/display 58 may also present a full range of indications and warnings, such as an audible tone, a visual warning, and/or other visual and audible indications for the pilot. In general the information presented by the indicator/display should be sufficient to allow the pilot to make an informed decision regarding the risks associated with navigating the aircraft along the projected present flight path and along altered flight paths to avoid the icing hazards associated with SLW.

A presently preferred embodiment of the present invention has been described above with a degree of specificity. It should be understood, however, that this description has been made by way of preferred example and the invention itself, however, is defined by the scope of the appended claims.

The invention claimed is:

1. Apparatus for detecting the presence of a region containing super-cooled liquid water or SLW in a cloud in a flight path ahead of an aircraft, comprising:
    means for transmitting a first radar beam signal at a first predetermined frequency into the cloud in front of the aircraft;
    means for transmitting a second radar beam signal at a first predetermined frequency into the cloud in front of the aircraft;
    one of the radar beam signals at the first or second predetermined frequencies exhibiting significantly different attenuation from propagation of that signal through the region of liquid water than the other one of the radar beam signals;
    the first and second transmitted radar beam signals reflecting from the cloud and creating first and second reflected signals which are received at the aircraft and which have the first and second predetermined frequencies, respectively;
    means for determining the power of the first and second reflected signals received at the aircraft and for supplying first and second received signals having magnitudes related to the power of the reflected signals received at the aircraft;
    means for sensing the temperature ambient of the aircraft and supplying a temperature signal representative of the ambient temperature;
    processor means responsive to the transmission of the first and second radar beam signals, the reception and magnitude of the first and second received signals, and the temperature signal, for:
        calculating the difference in power of the first and second received signals;
        detecting a region of liquid water from the difference of power of the first and second received signals;
        determining if the difference in power of the first and second received signals exceeds a predetermined threshold level representative of a quantity of liquid water which could result in an icing hazard; and
        utilizing the temperature signal to determine whether the detected region of liquid water is at a temperature in a range of 0° Celsius and less; and
        signalling an icing hazard condition if the difference in the magnitudes of the first and second received signals exceeds the predetermined threshold and if the determined temperature of the detected region of liquid water is 0° Celsius or less.

2. Apparatus as defined in claim 1 wherein said processor means further determines the amount of liquid water.

3. Apparatus as defined in claim 2 wherein said processor means determines the amount of liquid water over the range of the detected liquid water region.

4. Apparatus as defined in claim 2 wherein said processor means calculates the range differential of the difference in the power of the first and second received signals to determine the amount of liquid water over the length interval of the detected liquid water region.

5. Apparatus as defined in claim 2 wherein said processor means interpolates the difference in power of the first and second received signals over the length interval of the detected liquid water region to determine the amount of liquid water over the length interval of the detected liquid water region.

6. apparatus as defined in claims 4 or 5 further comprising:
    indicator means responsive to the processor means signalling an icing hazard and for indicating the icing hazard to a pilot of the aircraft.

7. Apparatus as defined in claim 6 wherein said indicator means further signals the location of the region presenting the icing hazard.

8. Apparatus as defined in claim 6 wherein the indicator means further signals the size of the region presenting the icing hazard.

9. Apparatus as defined in claim 6 wherein the indicator means further signals the size and location of the region presenting the icing hazard by presenting plan position indicator and range height indicator displays.

10. A method of detecting the presence of a region containing super-cooled liquid water or SLW in a cloud in a flight path ahead of an aircraft, comprising:
    transmitting a first radar beam signal at a first predetermined frequency into the cloud in front of the aircraft;
    transmitting a second radar beam signal at a first predetermined frequency into the cloud in front of the aircraft;
    selecting the predetermined frequencies of the radar beam signals so the first radar beam signal exhibits a significantly different attenuation from propagation of that signal through the region of liquid water than the other one of the radar beam signals;
    reflecting the first and second transmitted radar beam signals from the cloud to create first and second reflected signals which are received at the aircraft and which have the first and second predetermined frequencies, respectively;
    determining the power of the first and second reflected signals received at the aircraft and supplying first and second received signals having magnitudes related to the power of the reflected signals received at the aircraft;
    sensing the temperature ambient of the aircraft and supplying a temperature signal representative of the ambient temperature;
    calculating the difference in power of the first and second received signals;
    detecting a region of liquid water from the difference of power of the first and second received signals;
    determining if the difference in power of the first and second received signals exceeds a predetermined threshold level representative of a quantity of liquid water which could result in an icing hazard;

utilizing the temperature signal to determine whether the detected region of liquid water is at a temperature in a range of 0° Celsius and less; and signalling an icing hazard condition if the difference in the magnitudes of the first and second received signals exceeds the predetermined threshold and if the determined temperature of the detected region of liquid water is 0° Celsius or less.

11. A method as defined in claim 10 further comprising:

determining the amount of liquid water.

12. A method as defined in claim 11 further comprising:

determining the amount of liquid water over the range of the detected liquid water region.

13. A method as defined in claim 12 further comprising:

calculating the range differential of the difference in the power of the first and second received signals to determine the amount of liquid water over the length interval of the detected liquid water region.

14. A method as defined in claim 11 further comprising:

interpolating the difference in power of the first and second received signals over the length interval of the detected liquid water region to determine the amount of liquid water over the length interval of the detected liquid water region.

15. A method as defined in claims 13 or 14 further comprising:

indicating the icing hazard to a pilot of the aircraft.

16. A method as defined in claim 15 further comprising:

signalling the location of the region presenting the icing hazard.

17. A method as defined in claim 15 further comprising:

signalling the size of the region presenting the icing hazard.

18. A method as defined in claim 15 further comprising:

signalling the size and location of the region presenting the icing hazard by presenting plan position indicator and range height indicator displays.

* * * * *